United States Patent
Mizikovsky et al.

[11] Patent Number: 6,111,955
[45] Date of Patent: Aug. 29, 2000

[54] SECURITY IN CELLULAR TELEPHONES

[75] Inventors: Semyon B. Mizikovsky, Morganville; James Alexander Reeds, III, New Providence, both of N.J.

[73] Assignee: Lucent Technologies Inc., Murray Hill, N.J.

[21] Appl. No.: 08/797,371

[22] Filed: Feb. 7, 1997

[51] Int. Cl.[7] .................................................. H04K 1/00
[52] U.S. Cl. ............................................. 380/278; 380/46
[58] Field of Search .................................... 380/9, 21, 23, 380/43, 46, 49, 278, 247, 249; 455/417

[56] References Cited

U.S. PATENT DOCUMENTS

| 5,239,294 | 8/1993 | Flanders et al. | 380/46 |
| 5,513,245 | 4/1996 | Mizikovsky et al. | 380/21 |
| 5,572,193 | 11/1996 | Flanders et al. | 380/43 |
| 5,579,375 | 11/1996 | Ginter | 455/417 |
| 5,689,563 | 11/1997 | Brown et al. | 380/49 |
| 5,708,710 | 1/1998 | Duda | 380/21 |
| 5,794,139 | 8/1998 | Mizikovsky et al. | 380/23 |
| 5,799,084 | 8/1998 | Gallagher et al. | 380/21 |

*Primary Examiner*—Salvatore Cangialosi

[57] ABSTRACT

A system for delivering a security code to a cellular telephone. The cellular telephone holds a key X. The cellular telephone requests that an Authorization Center, AC, assign a security code to the cellular telephone. The AC selects a security code, and encrypts it, such that key X is effective to de-crypt the code, yet the AC does not know key X.

7 Claims, 4 Drawing Sheets

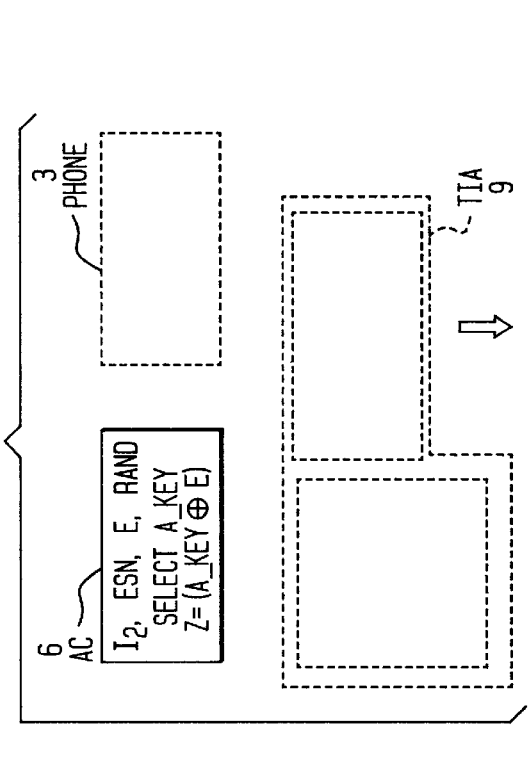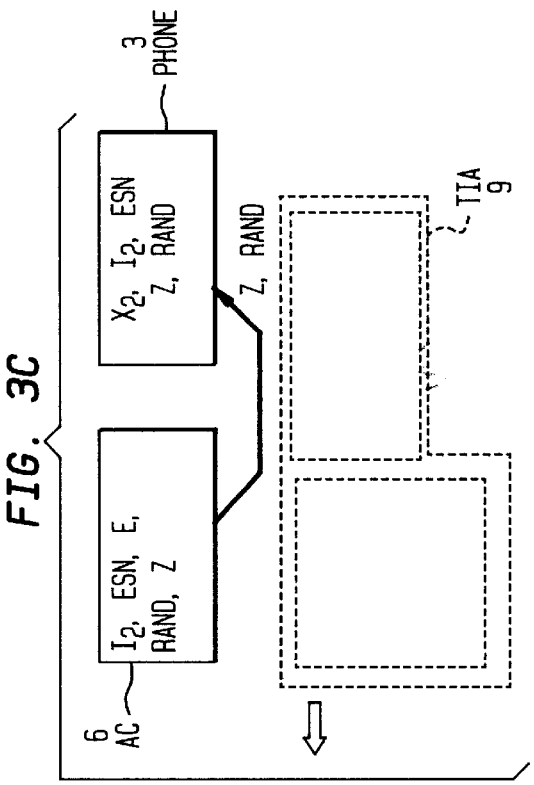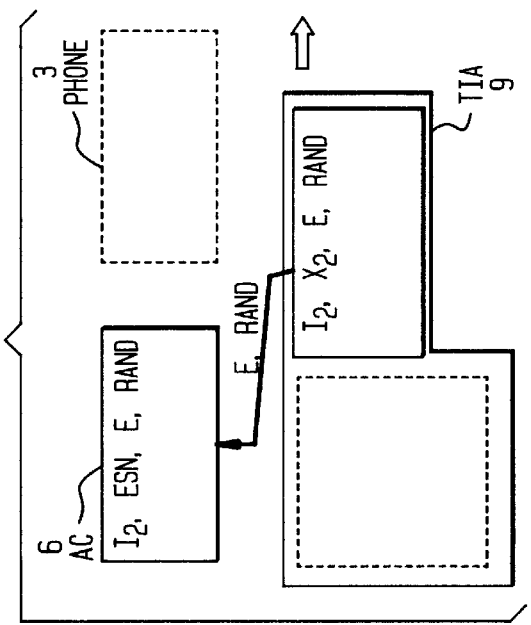

SECURITY IN CELLULAR TELEPHONES

The invention concerns security measures for preventing hackers from making illicit telephone calls on cellular telephones and, more specifically, measures for assigning security codes to cellular telephones with a minimal number of parties having access to the security codes assigned.

BACKGROUND OF THE INVENTION

A unique security problem exists in cellular telephones, which does not exist in ordinary telephones, and which is based on the anonymity of callers who use cellular telephones. In ordinary telephones, the callers are not considered anonymous, because telephone lines are always connected to identifiable premises, such as a house or an office. The party in possession of the premises is held responsible for the telephone calls, irrespective of who actually makes calls on the lines.

However, in cellular telephones, no such physical connections exist. Consequently, it is difficult, if not impossible, to identify a person making a cellular call. Nevertheless, procedures are undertaken to assure that only authorized persons are allowed to make calls.

As one example of such procedures, cellular telephones are assigned serial numbers at the time of their manufacture. When a person subscribes to cellular telephone service, an Authorization Key, or $A_{13}$Key, is assigned to the cellular telephone. The cellular telephone stores both the serial number, and the $A_{13}$Key.

When a person places a call, the cellular telephone first transmits a message to a cellular service provider, seeking authorization. This message includes both the serial number and the $A_{13}$Key, in encrypted format. The cellular service provider then ascertains whether the $A_{13}$Key has, in fact, been assigned to the serial number, and, if so, proceeds in completing the call. If not, the call is rejected.

However, great care must be taken to prevent hackers from obtaining knowledge of the $A_{13}$Keys which are assigned to the serial numbers. For example, if a hacker learns of a serial-number/$A_{13}$Key pair, then the hacker can undertake the authorization requests discussed above, and obtain cellular telephone service illegally.

It can be argued that the security procedures in common use do not provide maximum protection of the $A_{13}$Key assignments.

SUMMARY OF THE INVENTION

A cellular telephone needs a security code, which it uses to identify itself, when making calls. However, this security code must be kept secret, because a hacker in possession of the security code can illegally make calls, which will be billed to the cellular telephone.

In one form of the invention, the cellular telephone is equipped with a de-cryption key. A cipher text version of the security code is delivered to the cellular telephone, over a cellular channel. The cellular telephone de-crypts the cipher text, using the key, to obtain the security code.

BRIEF DESCRIPTION OF THE DRAWINGS

FIGS. 2 and 3 illustrate a sequence of steps involved in assigning an authorization code.

DETAILED DESCRIPTION OF THE INVENTION

Figure 1:
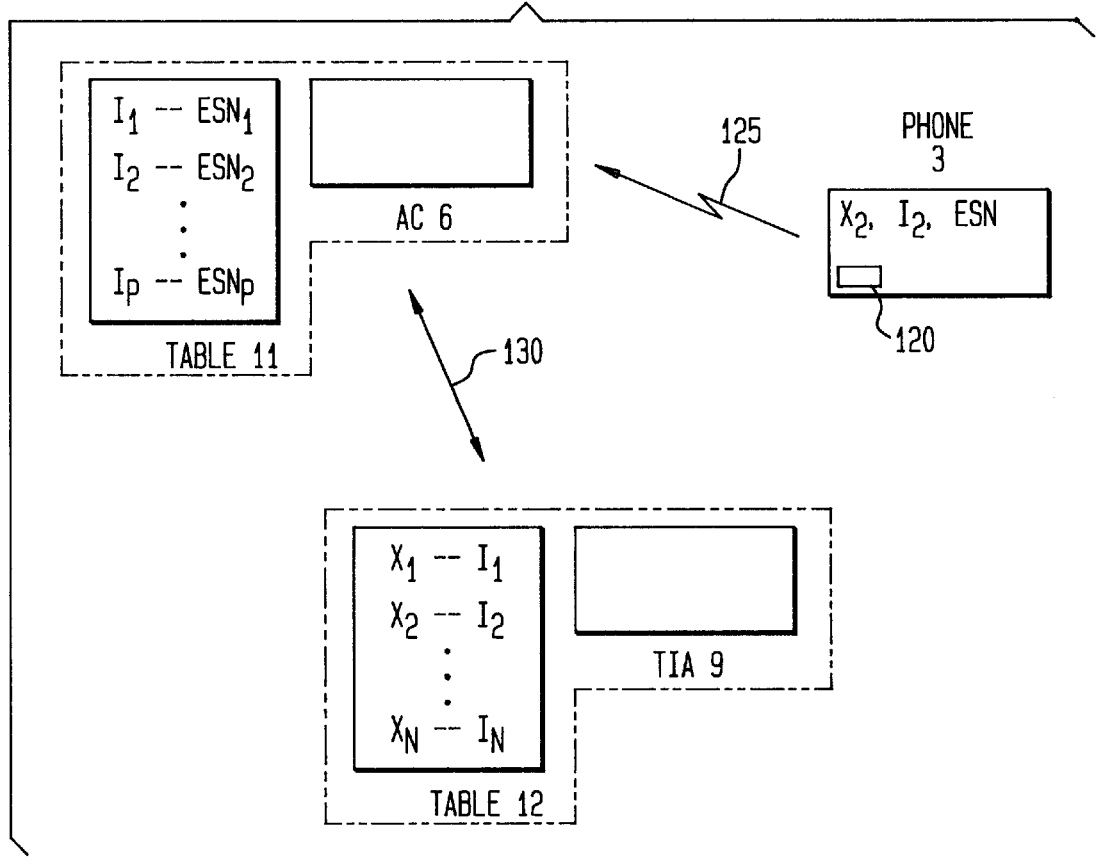
FIG. 1 illustrates three agents, namely, an Authorization Center, AC; a Trusted Industry Agent, TIA; and a cellular telephone, PHONE. These agents are involved in assigning an authorization code to the telephone.

FIG. 1 illustrates three agents involved in the assignment of an $A_{13}$Key to a cellular telephone, under the invention. One is the cellular telephone 3 itself. The second is an Authorization Center, or AC, 6. The third is a Trusted Industry Agent, TIA, 9.

The Authorization Center 6 is equipped with a table 11, which contains pairs of numbers. Each pair associates an index, I, with an Electronic Serial Number, ESN. The TIA 9 is also equipped with a table 12, which contains other pairs of numbers. Each pair associates the index, I, with a number X.

The phone 3 is manufactured to contain three numbers:

(1) an X, here indicated as X2, (2) an I, here indicated as I2, and (3) an ESN, or Electronic Serial Number.

The number X is preferably 64 bits in length. The X, I, and the ESN appear in tables 11 and 12.

The table 12 was created by the manufacturer of the telephone, and delivered to the TIA 9. As will be seen, it is important that this table 12 be maintained in confidence. The other table 11 is also generated by the manufacturer, and is used by the Authorization Center to verify the identity of callers who wish to obtain an $A_{13}$Key, as will be explained immediately below.

Against this background, the assignment of the $A_{13}$Key to the cellular telephone 3 can be viewed as requiring eight steps, which are shown in FIGS. 2 and 3. The agents which are actively involved in a given step are drawn in solid outline, for emphasis, while those which are not actively involved are drawn in phantom outline.

Figure 2A:
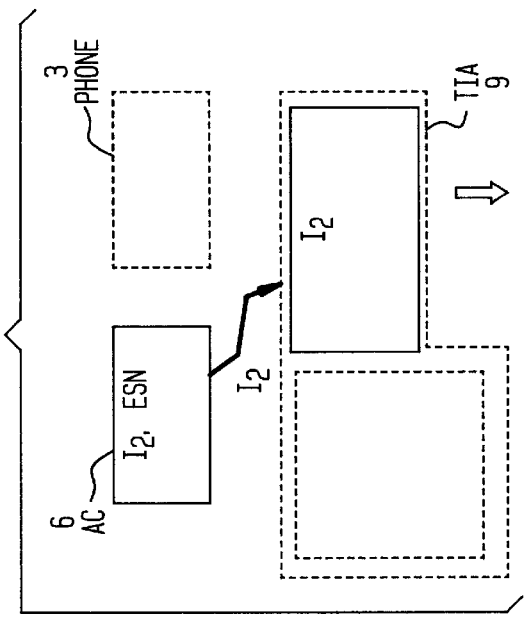

In FIG. 2A, the telephone 3 transmits its index, I2, together with its ESN, to the AC 6, as indicated by the arrow. This transmission can take the form of a normal cellular telephone call, but made to a specific telephone number, which the AC 6 answers. Preferably, the data is transmitted using the "cellular signalling message protocol," which is an industry-standard protocol. Alternately, the data can be carried by a sequence of Dual-Tone, Multi-Frequency (DTMF) signals. As another alternate, the cellular telephone can be equipped with a simple cellular modem 20 in FIG. 1, which transmits, and receives, the data.

After this transmission, the AC 6 is in possession of I2 and ESN, as indicated. The AC 6 consults table 11, and ascertains whether the two codes, I2 and ESN, belong to each other. If so, the AC 6 proceeds in the process of assigning an $A_{13}$Key to the telephone 3. If not, the procedure terminates.

Figure 2B:
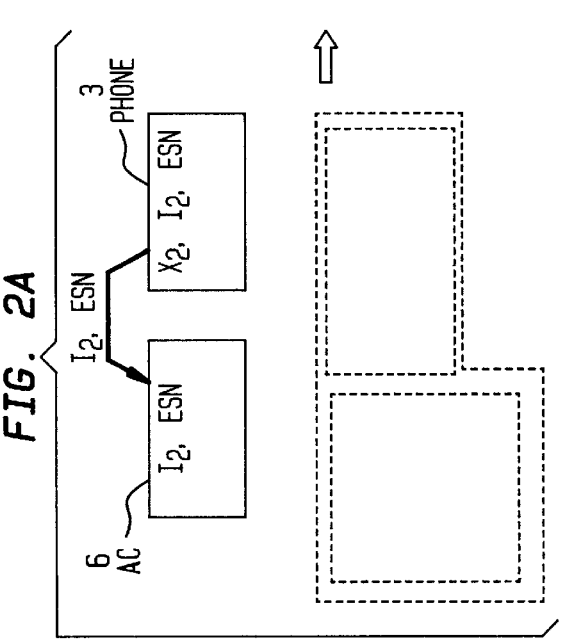
Figure 2C:
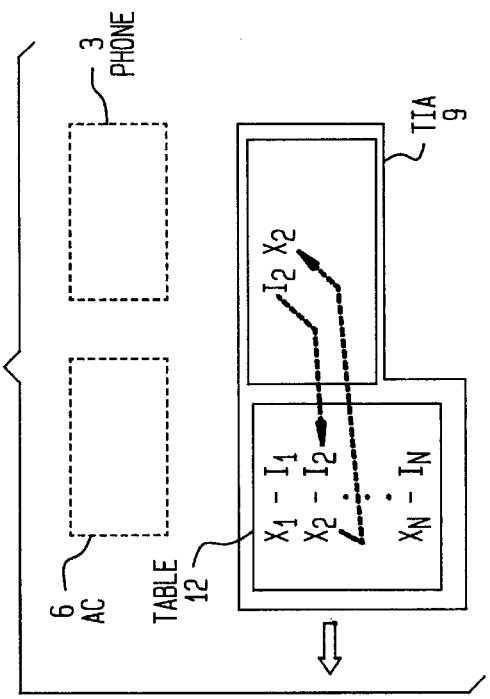

Next, as indicated in FIG. 2B, the AC 6 transmits the index I2 to the TIA 9. This transmission can be undertaken using network messaging, known in the art, and known security measures can be used by the TIA 9 to assure that the calling party is the genuine AC 6. The TIA 9 uses the index I2, as indicated in FIG. 2C, to locate the X in table 12 which corresponds to I2. The TIA 9 is now in possession of both I2 and its associated X2, as indicated.

Figure 2D:
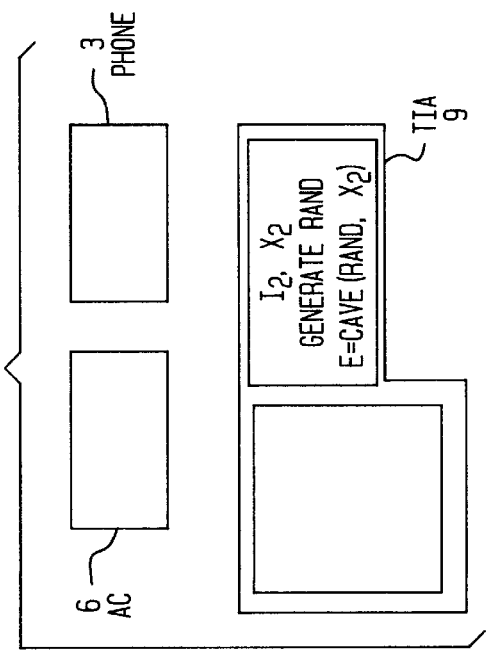

As shown in FIG. 2D, the TIA 9 then performs two computations. First, the TIA generates a random number, RAND. Then, using both RAND and X2, the TIA computes a number E, by using a non-reversible algorithm such as (1) SHA, Secure Hash Algorithm or (2) the algorithm known as MD-5, both of which are known in the art, or (3) CAVE, which is commercially available.

The TIA transmits both E and RAND to the AC, as indicated in FIG. 3A, thereby placing the AC 6 in possession of the four numbers I2, ESN, E, and RAND. Then, as indicated in FIG. 3B, the AC selects an $A_{13}$Key. The AC masks the $A_{13}$Key, by using E as a mask. The masking process indicated in FIG. 3B relies on the EX-OR function, as indicated by the cross-within-a-circle, but other masking operations are possible. The masking operation produces a number Z.

As indicated in FIG. 3C, the AC transmits both Z and RAND to the telephone 3. Then, as indicated in FIG. 3D, the telephone 3 first recovers E, using the CAVE function, based on RAND and X2. Finally, the telephone 3 unmasks Z, by EX-ORing Z against E, to obtain the $A_{13}$Key.

The telephone 3 stores the $A_{13}$Key. When the telephone 3 later makes an authorization request, as by contacting the AC, the telephone 3 transmits a code derived from the $A_{13}$Key, together with its ESN. The AC ascertains whether the $A_{13}$Key matches the ESN and, if so, allows the telephone 3 to continue with the call.

Flow Chart

Figure 4:
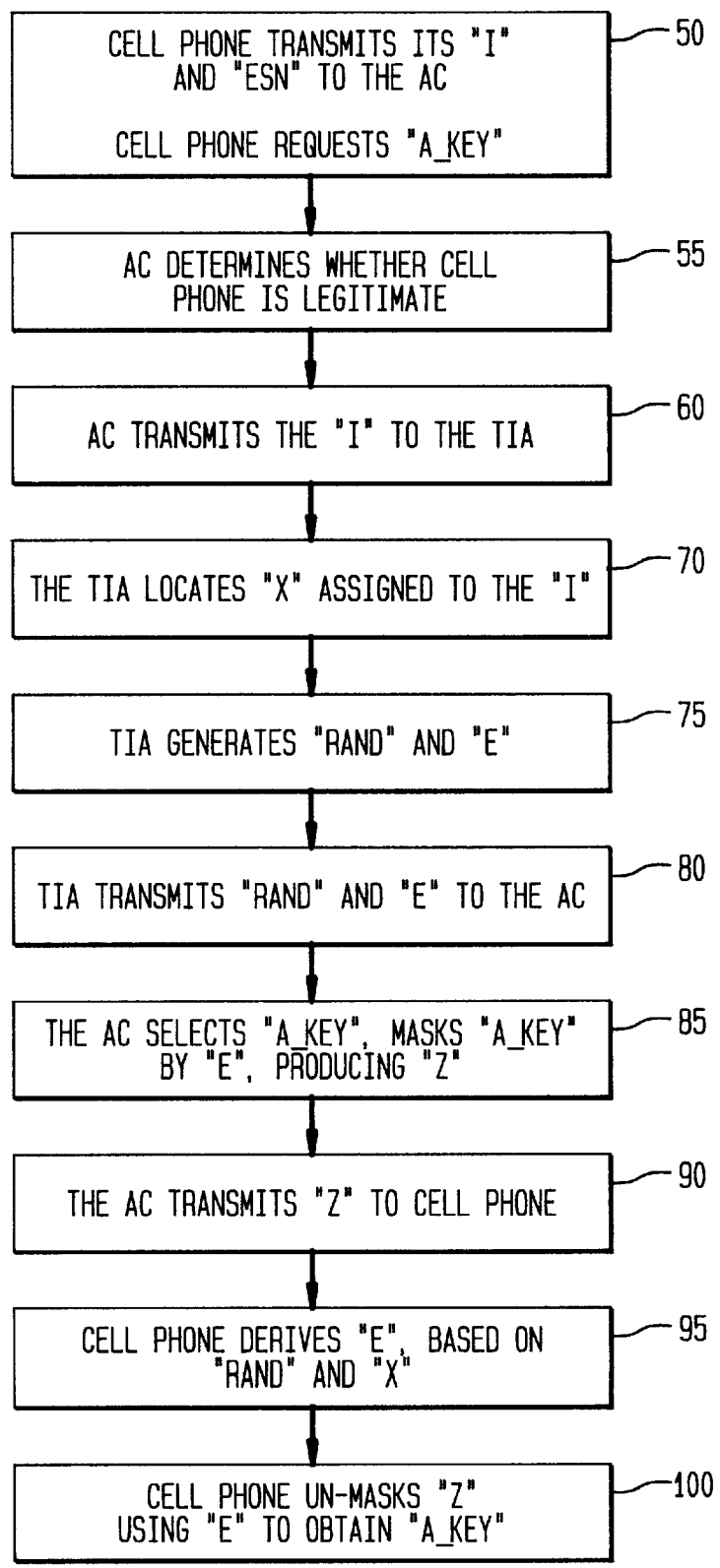
FIG. 4 illustrates a flow chart of steps involved in assigning an authorization code.

FIG. 4 is a flow chart illustrating logic which implements one form of the invention. In block 50, the telephone 3 transmits I2 and its ESN to the AC, and requests an $A_{13}$Key. In block 55, the AC, using table 11 in FIG. 1, determines whether the ESN belongs to I2, and, if so, proceeds. In block 60, the AC transmits I2 to the TIA. In block 70, the TIA locates the X, which is X2 in this example, assigned by the manufacturer to I2.

In block 75, the TIA generates RAND and, based on RAND and the X2 located in table 12, generates E. In block 80, the TIA transmits E and RAND to the AC. In block 85, the AC selects an $A_{13}$Key, and masks it with E, to produce Z. In block 90, the AC transmits Z and RAND to the telephone. In block 95, the telephone derives E, based on RAND and X2. Then, in block 100, the telephone un-masks Z, using E, to obtain the $A_{13}$Key.

A significant feature of the steps of FIG. 4 is that the process is fully automated. That is, no human observers are involved in, or witness, the computations.

Since the process is full automated, and no humans witness the variables chosen, such as RAND, Z, and E, the only possible avenue of obtaining variables is to intercept transmissions between the AC and the telephone. But, as explained above, these interceptions do not produce the $A_{13}$Key.

Significant Features

1. One characterization of the invention is the following. As background regarding terminology, "plain text" refers to a message which is not encrypted. "Cipher text" refers to a message in encrypted form.

An agent, AC, selects an $A_{13}$Key, and encrypts the $A_{13}$Key, as in FIG. 3B, to produce cipher text, in the form of number Z.

The encryption requires X2 for de-cryption. This is illustrated in FIG. 3D, wherein X2 is required to obtain E, which is used to un-mask Z, to obtain the $A_{13}$Key.

However, the agent AC does not know X2. Restated, the agent AC produces cipher text, Z, which requires X2 for recovery of the plain text, $A_{13}$Key, but the AC never uses X2, and has no access to X2.

2. As indicated in FIG. 3D, three numbers, namely, RAND, X2, and Z, are required to obtain the $A_{13}$Key. Of these, X2 is never available for interception by a hacker. That is, X2 is never transmitted between agents, not even on the ordinary telephone channel connecting the AC 6 with the TIA 9.

The only source of X2 is the telephone 3 itself in FIG. 1. However, it is assumed that the numbers, including X2, which are stored in the telephone 3 at the time of manufacture, are secure against discovery. That is, it is assumed that an excessive amount of reverse-engineering would be required to ascertain these numbers. Approaches to making these numbers secure are known in the art.

It is also assumed, as stated above, that table 12 is not available to a hacker. Therefore, it is assumed that X2 is not available to a hacker, and, thus, that the $A_{13}$Key assigned to the telephone 3 cannot be deduced.

From another point of view, if, to make a call, the telephone 3 transmits its $A_{13}$Key and its ESN to the AC 6 for authorization, a hacker must know these two numbers, in order to impersonate the telephone 3. However, the only party who knows which $A_{13}$Key is associated with the telephone's ESN is the AC 6.

Since the AC 6 sells cellular telephone service, it is assumed that the AC 6 will impose tight security on the knowledge of the $A_{13}$Key/ESN assignments.

3. Transmissions between the AC 6 and the TIA 9 are considered secure. They are undertaken, for example, using network messaging approaches, perhaps using encryption. Consequently, only the data traffic running between the phone 3 and the AC, and occurring in FIGS. 2A and 3C, are subject to interception. However, this traffic provides no information which can lead a hacker to the $A_{13}$Key. For example, assume the best case for the hacker: that he intercepts all of this traffic, and thereby obtains I2, ESN, RAND, and Z.

But he needs the number E to unmask Z, to obtain $A_{13}$Key, as indicated by the bottom line in FIG. 3D. To obtain E, he needs number X2, as indicated by the second-to-last line. But X2 is secure within the telephone 3, as stated above.

Thus, to repeat, if a hacker intercepts all interceptable transmissions, the hacker cannot deduce the $A_{13}$Key.

4. Point number 3 illustrated the impossibility of a hacker obtaining A Key through interception. An alternate possibility is that the hacker would act as an imposter, by representing himself as a telephone 3. In this scenario, the hacker finds no greater success.

For example, assume that the hacker fabricates an index I, and successfully presents it to the AC, as indicated in FIG. 2A. This I leads to a corresponding X, taken from table 12 of FIG. 2C, which, in turn, leads to the mask E in FIG. 2D. If the hacker could obtain mask E, the hacker could recover the $A_{13}$Key, using the last step indicated in FIG. 3D.

However, the hacker never receives mask E, only Z and RAND. The hacker cannot obtain $A_{13}$Key without mask E, and, for this, the hacker needs the X obtained from table 12 in FIG. 2C. This X is available only to (1) the telephone 3, (2) the TIA 9, and (3) the manufacturer of phone 3, all of which are considered secure.

Thus, fabricating an "I" leads to no success.

5. A given telephone 3 may request a new $A_{13}$Key. This can occur, for example, when the owner of telephone 3 sells the telephone. When the new $A_{13}$Key is requested, a new mask E is generated in FIG. 3D, because the RAND of FIG. 2D will be different, because random. The previous mask E becomes worthless, and the new $A_{13}$Key cannot be deduced, using previous variables, such as RAND or Z, used to derive the previous $A_{13}$Key.

6. The process indicated in FIGS. 2 and 3 places a strict limit on the parties who learn the $A_{13}$Key assigned to telephone 3. Neither the manufacturer, nor the TIA, know the A Key assigned to the telephone 3, because the AC selects the $A_{13}$Key, and informs neither of these parties of the $A_{13}$Key selected.

Nor do either the manufacturer, nor the TIA, know which telephone 3 is involved in the $A_{13}$Key assignment process of FIGS. 2 and 3. The manufacturer, of course, is completely uninvolved, and does not know of the call made in FIG. 2A. Even though the TIA knows of the call, the TIA merely locates an X, based on an index I, in FIG. 2C, and performs the two computations of FIG. 2D. But the TIA has no knowledge of which "ESN" is associated with the "I," and thus does not know which telephone is making the call.

7. The invention imposes another strict limit, which is on the parties who are able to hack the $A_{13}$Key assigned to telephone 3. As the discussion above indicated, knowledge of the X contained in the telephone 3 is a requirement for obtaining the $A_{13}$Key. But, as also explained above, that knowledge cannot be obtained from the telephone 3 itself, because the telephone 3 has been made tamper-proof. The only source of the X is table 12, in FIG. 2C, which is currently held by the TIA. However, the TIA is, by stipulation, considered an honest party who will not cooperate with hackers.

The manufacturer is also a potential source of table 12, but is eliminated, on the basis of assumed honesty. In addition, the manufacturer will probably stand as a potential source of table 12 for only a very brief period of time, thereby significantly reducing the time-frame over which access to table 12 is even possible.

That is, the manufacturer produces tables 11 and 12. Table 11 is delivered to the AC; table 12 is delivered to the TIA. After the deliveries, the manufacturer has no further interest in the tables and, in fact, will probably destroy its own copies, in order to eliminate the trouble and overhead involved with storing them. Thus, the manufacturer will be in possession of the tables for only a brief period of time, namely, from their creation to their delivery. This time can be as short as a few hours, or even minutes.

8. The manufacturer of the telephone 3 in FIG. 1 programs the numbers X, I, and ESN into the telephone. However, there is no relation between these numbers and the $A_{13}$Key. Restated, there is no way to deduce the $A_{13}$Key from these three numbers. Further, every telephone is not required to own a unique X: different telephones can be assigned the same X, provided that the X's are un-correlated, in the statistical sense.

9. The E transmitted to the AC 6 in FIG. 3A will be different, for different transactions, partly because E depends on a random number generated in FIG. 2D, and partly because E depends on X. Both the random number and X will, in general, be different, for different telephones.

10. Preferably, the events of FIGS. 2 and 3 occur during a single telephone call made by the telephone 3 to the AC. Within the cellular telephone 3, data reception, transmission, and processing is performed by apparatus known in the art, and indicated by block 120 in FIG. 1. The telephone 3 is linked to the AC by a cellular channel 125, and the AC is linked with the TIA by any suitable communication link 130.

Numerous substitutions and modifications can be undertaken without departing from the true spirit and scope of the invention. What is desired to be secured by letters patent is the invention as defined in the following claims.

What is claimed is:

1. A method of assigning a security code to a cellular telephone, which stores a number X, an index I, and a serial number ESN, comprising the following steps:
   a) maintaining a table (12) with a custodian (TIA), which table contains multiple pairs of numbers, each pair associating an index I with a number X;
   b) receiving an index I from the cellular telephone;
   c) transmitting the index I to the custodian (TIA);
   d) causing the custodian (TIA) to
      i) identify the number X associated with the transmitted index I in the table,
      ii) generate a random number RAND, and
      iii) generate a mask E, based on X and RAND,
   e) selecting a security code $A_{13}$Key;
   f) masking the security code $A_{13}$Key with the mask E, to produce a number Z; and
   g) transmitting number Z and the random number RAND to the cellular telephone.

2. Method according to claim 1, wherein the number X is never available for interception.

3. Method according to claim 1, wherein the number X is never transmitted between parties.

4. A method of assigning an A-key to a wireless telephone, which functions as a serial number of the wireless telephone in billing matters, comprising the following steps:
   a) maintaining an algorithm in the wireless telephone which
      i) produces the A-key when given a first code (RAND), a second code (Z), and a third code (X2), and
      ii) requires the first, second, and third codes collectively to produce the A-key;
   b) maintaining the third code (X2) within the wireless telephone;
   c) receiving, from a remote party, the first and second codes (RAND, Z) at the wireless telephone and delivering them to the algorithm;
   d) delivering the third code (X2) to the algorithm; and
   e) producing the A-key from the algorithm, using RAND, Z, and X2, and storing the A-key within the telephone.

5. Method according to claim 4, wherein the third code (X2) is not known to the remote party transmitting the first and second codes (RAND, Z) to the wireless telephone.

6. A method of assigning an A-key to a wireless telephone, which functions as a serial number of the wireless telephone in billing matters, comprising the following steps:
   a) maintaining an algorithm in the wireless telephone which
      i) produces the A-key when given a first code (RAND), a second code (Z), and a third code (X2), and
      ii) requires the first, second, and third codes collectively to produce the A-key;
   b) transmitting two codes, I and ESN, from the wireless telephone to a telephone service provider;
   c) relaying the code I from the telephone service provider to a third party (TIA);
   d) causing the third party (TIA) to
      i) ascertain the value of the third code (X2) from a table, based on code I;
      ii) generate a random number (RAND);
      iii) apply the ascertained value of the third code (X2) and the random number (RAND) to a non-reversible algorithm, to produce a mask (E); and
      iv) transmit the mask (E) to the telephone service provider;

e) causing the telephone service provider to
   i) select an A-Key;
   ii) mask the A-Key, using the mask (E), to produce a transmission code (Z); and
   iii) transmit the transmission code (Z) and the random number (RAND) to the wireless telephone; and
f) causing the wireless telephone to
   i) produce the mask (E), based on the received random number (RAND), and the non-received third code (X2);
   ii) produce the A-key, based on the received transmission code (Z) and the mask (E); and
   iii) store the A-Key.

7. A system for assigning an A-key to a wireless telephone, comprising:

a) a first party (TIA);

b) a second party (AC);

c) means, which utilizes processing undertaken by the first and second parties, which
   i) selects the A-key
   ii) enables the second party (AC) to deliver the A-key, in encrypted form, to the wireless telephone, without access to a key effective to extract the A-key from its encrypted form, and
   iii) transmits no data to the wireless telephone from which the A-key can be derived by another party.

* * * * *